United States Patent
Avellan

(10) Patent No.: US 8,384,758 B1
(45) Date of Patent: Feb. 26, 2013

(54) VIDEO MANAGEMENT SYSTEM OVER SATELLITE

(75) Inventor: Abel Avellan, Miami, FL (US)

(73) Assignee: EMC SatCom Technologies, LLC, Miami, FL (US)

( * ) Notice: Subject to any disclaimer, the term of this patent is extended or adjusted under 35 U.S.C. 154(b) by 0 days.

(21) Appl. No.: 13/424,012

(22) Filed: Mar. 19, 2012

Related U.S. Application Data

(63) Continuation of application No. 13/285,870, filed on Oct. 31, 2011.

(60) Provisional application No. 61/521,053, filed on Aug. 8, 2011.

(51) Int. Cl.
  *H04N 7/14* (2006.01)
(52) U.S. Cl. ............... 348/14.09; 348/14.08; 348/14.12; 455/414.1
(58) Field of Classification Search .... 348/14.01–14.16; 370/260–261; 455/414.1, 445, 567
  See application file for complete search history.

(56) References Cited

U.S. PATENT DOCUMENTS

| | | | | |
|---|---|---|---|---|
| 4,882,743 | A * | 11/1989 | Mahmoud | ............... 348/14.09 |
| 5,801,679 | A | 9/1998 | McCain | |
| 5,812,545 | A | 9/1998 | Liebowitz et al. | |
| 6,697,850 | B1 | 2/2004 | Saunders | |
| 7,130,908 | B1 | 10/2006 | Pecus et al. | |
| 7,836,470 | B2 | 11/2010 | Ortega Rodriguez et al. | |
| 2001/0018703 | A1 | 8/2001 | Miyazawa et al. | |
| 2002/0031120 | A1 | 3/2002 | Rakib | |
| 2003/0074672 | A1 | 4/2003 | Daniels | |
| 2005/0008240 | A1 * | 1/2005 | Banerji et al. | ............... 382/238 |
| 2009/0160929 | A1 * | 6/2009 | Wu et al. | ............... 348/14.09 |
| 2010/0228875 | A1 | 9/2010 | Myers | |
| 2012/0185783 | A1 | 7/2012 | Avellan et al. | |

FOREIGN PATENT DOCUMENTS

| | | | |
|---|---|---|---|
| EP | 677962 A1 | * | 10/1995 |
| WO | WO 9967953 A1 | * | 12/1999 |

OTHER PUBLICATIONS

Armon, A., et al., "Cache Satellite Distribution Systems: Modeling and Analysis"; School of Computer Science, Tel Aviv University, Tel Aviv, Israel; 2003 IEEE (11 pages).

* cited by examiner

*Primary Examiner* — Melur Ramakrishnaiah
(74) *Attorney, Agent, or Firm* — Blank Rome LLP

(57) ABSTRACT

A videoconference system has videoconference terminals which communicate with a centralized station over satellite. Video signals from each videoconference terminal are unicast to the centralized station via satellite. The centralized station forms a composite signal of all the video signals multicasts the composite signal to the local videoconference terminals over satellite that can be received by hundreds, thousands or more recipients. The system dynamically allocates satellite bandwidth and other network resources to establish a high definition videoconference call on demand. A frequency allocation manager manages the resources available on the satellite network according with the capacity of each transponder and network resources available. It administrates the resources available and dynamically assigns a satellite capacity and network resources.

20 Claims, 2 Drawing Sheets

VIDEO MANAGEMENT SYSTEM OVER SATELLITE

RELATED APPLICATION

The present application is a continuation of U.S. patent application Ser. No. 13/285,870, filed Oct. 31, 2011, which claims priority to provisional application No. 61/521,053, filed Aug. 8, 2011, the entire contents of which are hereby incorporated by reference.

FIELD OF THE INVENTION

The present invention relates to conference management. More particularly, the present invention is for a video management system over a multicast satellite network using bandwidth on demand.

BACKGROUND OF THE RELATED ART

Videoconferencing systems are typically designed to operate over terrestrial networks using unicast platforms based on H323 and Session Initiation Protocol (SIP) protocols. Each videoconference terminal sends and receives video signals to the other participating terminals. The videoconference is established by having unicast bi-directional connections between the video terminals. So, a videoconference having three sites A, B, C would require three unicast connections: A-B, A-C, B-C; and, a videoconference between four sites A, B, C, D would require six unicast connections: A-B, A-C, A-D, B-C, B-D, C-D. Each connection requires a channel with sufficient bandwidth to send and receive the video signals, so that the total bandwidth required is cumulative. If each of the three unicast connections in a 3-way videoconference required a 2 Mbit bandwidth, the total videoconferencing system would require 6 Mbit of bandwidth (2 Mbit×3 channels). However, this type of system is costly, inefficient and prone to failure.

SUMMARY OF THE INVENTION

It is an object of the present invention to provide a videoconference system which communicates via satellite. It is a further object of the invention to provide a videoconference system having remote stations which communicate over satellite with a hub station. It is a further object of the invention to provide a videoconference system which can serve geographically dispersed locations. It is yet another object of the invention to provide a videoconference system which can concurrently connect few to thousands of users.

In accordance with these and other objects of the invention, a videoconference system is provided which communicates over satellite. The invention is bandwidth efficient, and the videoconference sessions have high quality independent of congestion conditions over the transport network. Videoconference signals can be multicast over satellite so that a signal from a single sender can be received by hundreds, thousands or more recipients, to reduce satellite consumption. The system dynamically allocates satellite bandwidth and other network resources to establish a high definition videoconference call on demand. A frequency allocation manager manages the resources available on the satellite network according with the capacity of each transponder and network resources available. It administrates the resources available and dynamically assigns a satellite capacity and network resources.

DETAILED DESCRIPTION OF THE PREFERRED EMBODIMENTS

Figure 1:
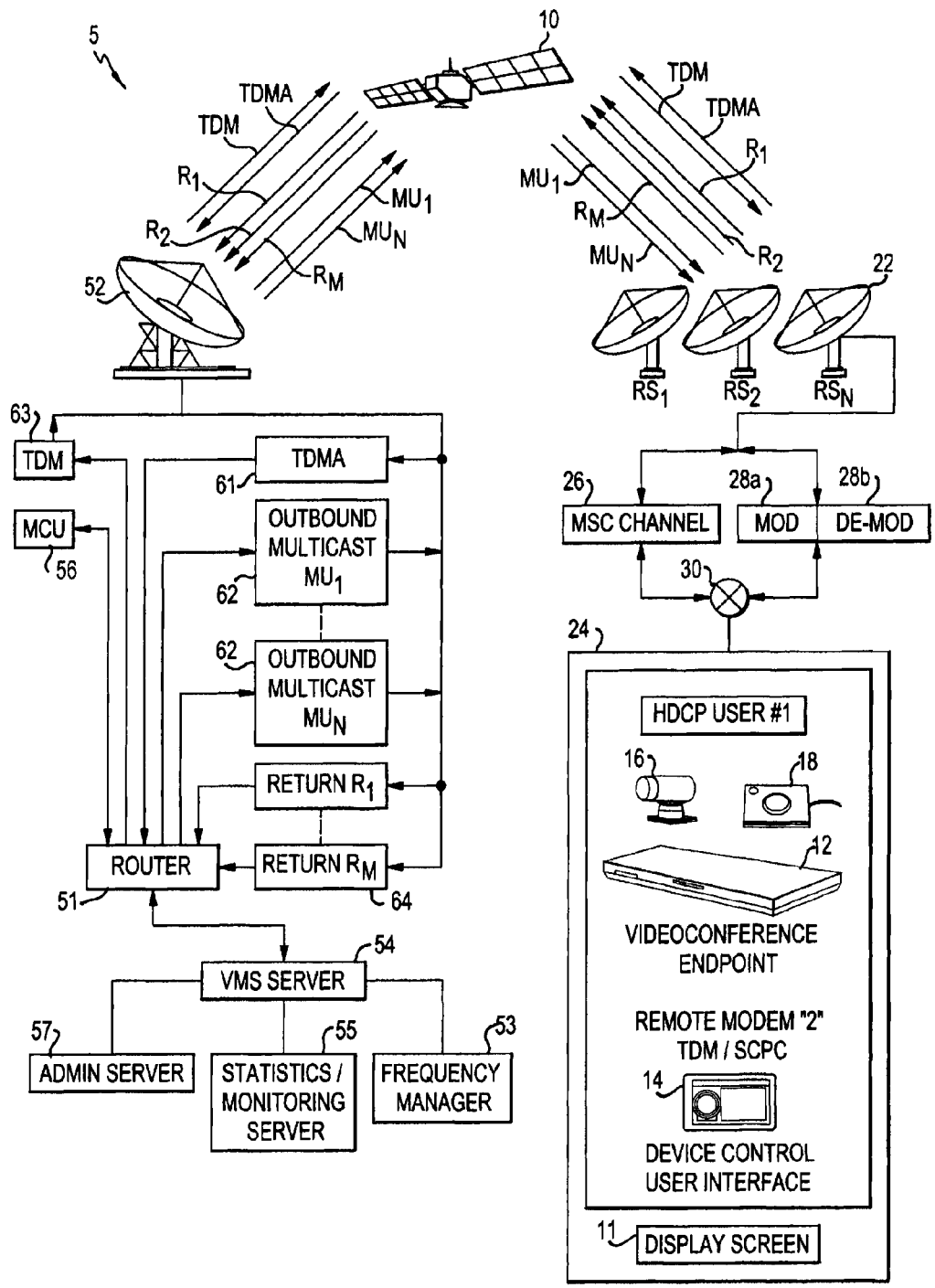
FIG. 1 is a block diagram of the system in accordance with the preferred embodiment of the invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose.

As shown in FIG. 1, a system 5 is provided having a Hub Station H and a plurality of Remote Stations $RS_1, RS_2 \ldots RS_N$ which communicate with one another via the satellite 10. The Remote Stations $RS_1, RS_2 \ldots RS_N$ each include an antenna 22 and hardware and signal conditioning elements which control the transmission and reception of signals over the antenna 22 to/from the Hub Station H via the satellite 10. The Hub Station H includes an antenna 52 and hardware and signal conditioning elements which control the transmission and reception of signals over the antenna 52 to/from the Remote Stations via the satellite 10.

The Remote Stations $RS_1, RS_2 \ldots RS_N$ each have a Videoconference Endpoint (VCE) 24. As shown, the VCE 24 includes a display screen 11, a videoconference endpoint element (CODEC) 12, a video/audio camera 16, and a microphone 18. The VCE 24 generates an outgoing video/audio signal and receives and displays an incoming video/audio signal. The endpoint 12 connects to the display screen 11 to display images and also connects to the video camera 16 to receive video images and to the microphone 18 to receive audio. The VCE 24 also includes or is in communication with a user interface control device 14.

The Hub Station includes a Video Management System (VMS) module or server 54 and a Media Control Unit (MCU) 56. The VMS server 54 includes or is in communication with a frequency manager 53, statistics and monitoring module 55, and an administration module 57. The VMS 54 can also have or be in communication with a memory or database to store data for the various modules 53, 55, 57. The modules 53, 55, 57 are shown as separate elements, but can be a single shared database. The VMS 54 controls the operation of the Hub station H based on information stored at each of the modules 53, 55, 57. The administration module 57 contains information on the configuration of the overall system. The frequency manager 53 contains information on the monitoring, allocation and uses of the satellite spectrum. For instance, in a star network configuration, there are M Remote Station satellite terminals connected to the Hub Station H via a primary link with the modulator 28a and the demodulator 28b (where the modulator 28a and demodulator 28b together form a modem). The MSC 26 utilizes Time Division Multiple Access (TDMA) signaling, so that the uplink TDMA channels are time-shared by all of the Remote Stations $RS_1, RS_2 \ldots RS_N$ and the downlink TDM channels are multicast.

Figure 2:
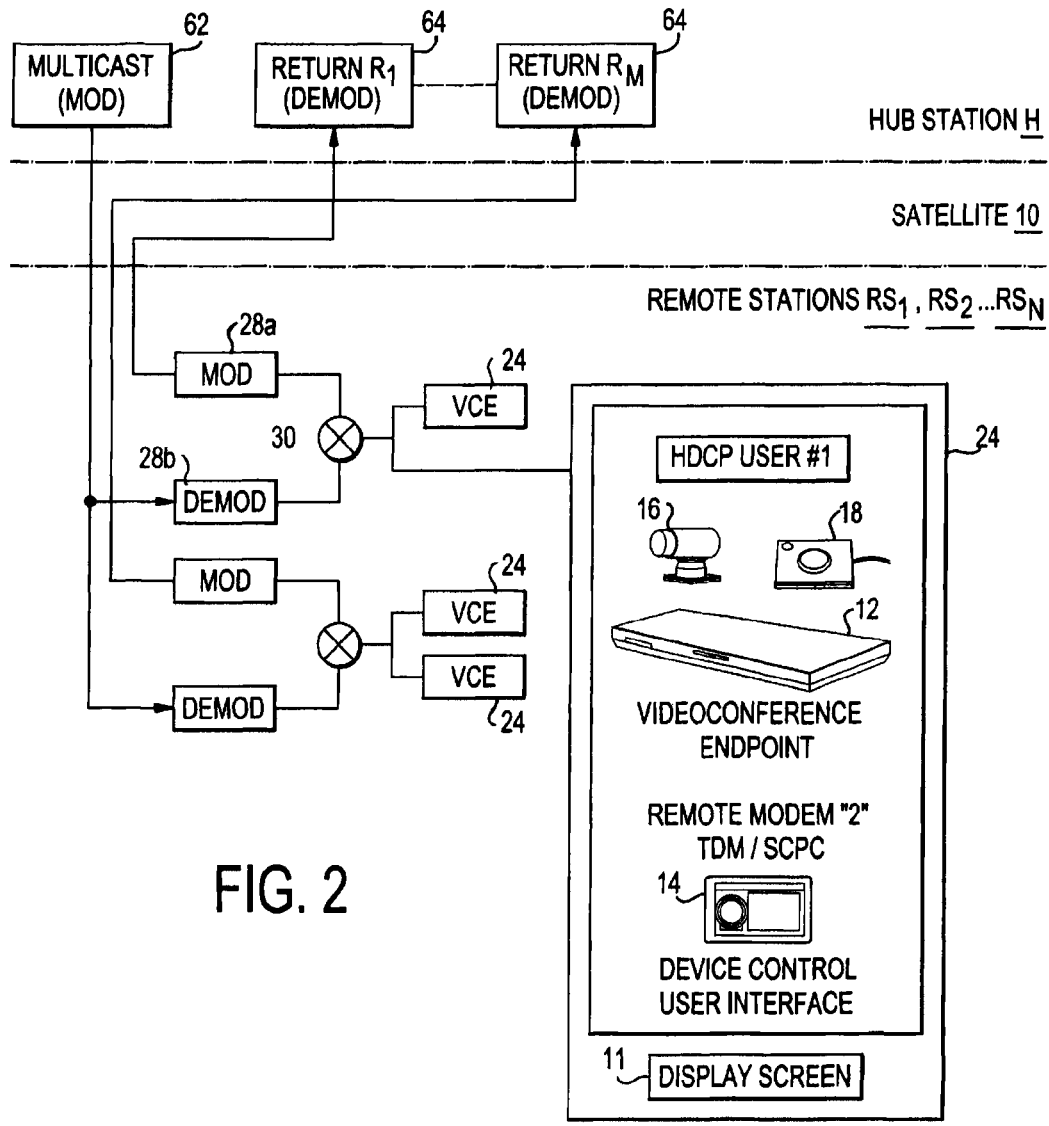
FIG. 2 is a block diagram of the invention showing communication flow.

The MCU 56 is connected to a router 51, which in turn is connected to N outbound multicast channels $MU_1 \ldots MU_N$ 62 and M return channels $R_1 \ldots R_M$ 64. The multicast channels 62 and the return channels 64 preferably use standard H323 or SIP protocol over IP transport bidirectional channel. The return channels 64 receive signals from the Remote Stations $RS_1, RS_2 \ldots RS_N$, and are preferably Single Channel Per Carrier (SCPC). The parameters for the SCPC return channels 64 (including symbol rate, data rate, FEC, etc.) are defined by the Administrator module 57. Preferably, each return channel 64 accommodates a single signal at a single frequency and bandwidth as. Each return channel 64 is allocated to a specific frequency on demand according to the need of a user to establish a connection between one of the Remote Stations $RS_1, RS_2 \ldots RS_N$ and an available return channel 64. As best shown in FIG. 2, the Remote Stations $RS_1, RS_2 \ldots RS_N$ send out a signal from the modulator 28a which is then received on one of the return channels 64 at the Hub Station H. The return channels 64 demodulate the received signal and pass it through the router 51 to the MCU 56 for further processing.

As further shown in FIG. 2, the outbound multicast channels 62 simultaneously and continuously transmit multicast signals from the Hub Station H to all of the Remote Stations $RS_1, RS_2 \ldots RS_N$. The MCU 56 prepares a composite image signal (in the form of IP packets) from the video/audio signals received on the Return Channels 64, modulates the composite signal, and multicasts the composite signal out over one or more of the outbound multicast channels 62 to the Remote Stations $RS_1, RS_2 \ldots RS_N$. This provides a continuous presence videoconference call for display at numerous Remote Stations $RS_1, RS_2 \ldots RS_N$ at one time. The composite videoconference signals are received at the demodulator 28b of the Remote Stations $RS_1, RS_2 \ldots RS_N$. The demodulators 28b are always connected to one of the outbound multicast channels 62 to receive any multicast signal being transmitted by the Hub Station.

Each Remote Station $RS_1, RS_2 \ldots RS_N$ preferably has its own Monitor/System Channel control (MSC) 26, modulator 28a, demodulator 28b, switch 30, Videoconference Endpoint (VCE) 24 which can include or communicate with a high definition user interface connection control device 14. The control device 14 allows multiple parties to engage in a videoconference. Users can login, manage their phone book, call other subscribers or start an ad-hoc call, as well as terminate an ongoing call session. The control device 14 uses standard Simple Network Management Protocol (SNMP) commands to commission remote modems, modems in the Hub station H, and SNMP or Application Programming Interface (API) commands to dial on the videoconference H323/SIP endpoints of the Video On Demand (VOD) subscribers.

The frequency manager 53 can include a memory or database of available modems in the Hub station H and a table of available frequencies. The VMS server 54 provides a backup mechanism to ensure that the availability and statistics of the modems is accurately reflected in the frequency manager 53 and the statistics module 55. The VMS 54 periodically polls the modulator 28a and demodulator 28b and records the status to the statistics/monitoring module 55 and the frequency manager 53. For instance, if the modulator is active, the VMS 54 knows that a designated return channel is not available. The VMS 54 can also determine if the modulator 28a or demodulator 28b is faulty or inactive, and record that as well. The statistics/monitoring module 55 also retains information about system usage, billing, idle channels and the quality of conference calls, which can all be obtained based on polling performed by the VMS server 54.

The control device 14 allows for users to schedule VOD calls in advance and also is capable of calling non-VOD subscribers defined in the phone book or ad-hoc calls. The control device 14 is preferably in direct communication with the VCE 24 and the switch 30 and implemented via a website. The control device 14 can be directly coupled with the VCE 24 and the switch 30, or can be a separate device which is in wireless communication with the VCE 24 and the switch 30. The control device 14 is preferably includes a processor operating software instructions and can be, for instance, a personal computer, smartphone, or other device. The control device 14 is preferably located at the same room or location as the VCE 24.

The control device 14 is used to control the operation of the VCE 24. The control device 14 provides an easy-to-use user interface to manage the basic functions of the one associated VCE 24. The control device 14 includes the functions of: connect/disconnect from a videoconference; VOD phone book; non-VOD phone book; recent calls; camera and microphone control, such as far end and near end cameral control (pan, tilt, zoom), self view on/off, mute, unmute, and volume control. The user can also use the control device 14 to establish a High Definition (HD) videoconference session using a scheduling system. The scheduling system automatically begins the configuration of the modems and places the HD videoconference call on the time setting on the database. The scheduling can begin videoconferences ad-hoc or scheduled.

Figure 3:
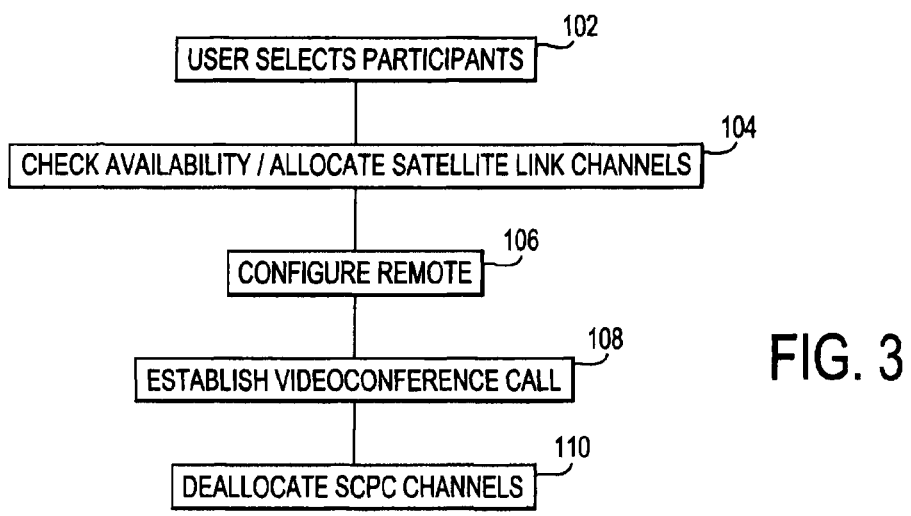
FIG. 3 is a flow diagram of the operation of the system.

Operation of the system 5 will be discussed with reference to FIG. 3 in combination with FIG. 1. Starting at block 102, a user accesses the control device 14 at one of the Remote Stations $RS_1, RS_2 \ldots RS_N$ (for instance Remote Station $RS_1$) to establish a call with desired participants at one or more other Remote Stations (for instance, Remote Station $RS_2$). The user request is sent from the control device 14 to the MSC 26. The MSC 26 is always connected to the Hub Station H, for instance using a TDM and/or TDMA connection. The MSC 26 provides connectivity between the control device 14 and the VMS server 54 at the Hub Station H at all times (i.e., including before, during, and after videoconference calls). The MSC 26 sends a number of control and/or communication signals from the Remote Stations $RS_1, RS_2 \ldots RS_N$ to the Hub Station H via the TDMA channel, including: frequency allocation requests, call initiation/termination requests, call quality, follow up and all monitor and control signals transmitted and received between the Remote Stations $RS_1, RS_2 \ldots RS_N$ and the Hub Station H. The TDM channel 63 (which can also be a dedicated time shared multicast channel) can be utilized to receive a signal from the Hub station H in response to the various control or communication signals.

Thus, in accordance with the exemplary embodiment, the MSC 26 receives the frequency allocation request from the control device 14 via the switch 30, requesting that first Remote Station $RS_1$ be connected to the second Remote Station $RS_2$. The MSC 26 forwards the frequency allocation request signal to the VMS server 54 over the TDMA channel 61 via the remote antenna 22, the satellite 10, the hub antenna 52, and the router 51. The VMS server 54 pulls data from the frequency manager 53 to determine which ones of the return channels 64 are available and assigns an available return channel 64 (for instance, return channel 1) to the requesting Remote Station $RS_1$ on demand, step 104. The VMS 54 notifies the Remote Station $RS_1$ via the TDM channel 63 of the designated return channel, and the modulator 28a can be configured to operate on the assigned return channel 64. The return channel is created on demand for the requesting Remote Station $RS_1$ by dynamically linking the modulator 28a with the assigned return channel 64 (channel 1 in our example).

The VMS server 54 performs the frequency assignment to adapt the bandwidth of the satellite on demand. The VMS 54 detects when a conference call is being initiated and obtains the desired amount of bandwidth. The satellite 10 is associated with a pool of frequencies that are used on demand, such as the frequency associated with each of the return channels 64. The frequency manager 53 includes information as to which frequencies are available for use, and the VMS 54 connects the call over one of the available frequencies for use as the uplink channel for the signal being sent from the requesting Remote Station $RS_1$.

Turning to step 106, the return channel parameters have been predetermined by the VMS 54 in conjunction with the information stored in the frequency database 53. Each remote satellite modem of any participants using the Single Channel Per Carrier (SCPC) return channel 64 will be configured accordingly. The VMS 54 configures the link and verifies the performance and quality of the communication (and update that information to the statistics/monitoring module 55), and then starts the HD videoconference call between the participating Remote Stations $RS_1$, $RS_2$ . . . $RS_N$. For instance, the VMS 54 can change the state of the satellite modems, turn on/off the modems, pair the remote modem to one satellite modem available at the return channels 64, configure the SCPC the modems on the Remote Stations $RS_1$, $RS_2$ . . . $RS_N$ and place the videoconference call during the videoconference call session.

At this point in our example, a dedicated videoconference connection has been established between the requesting Remote Station $RS_1$ and the Hub Station H on the first return channel 1, step 108. The VMS 54 also notes the parameters of the videoconference call, including the requesting remote station and all of the participating remote stations designated by the requesting remote station. The VCE 24 generates an audio/video signal captured by the video camera 16 at the requesting Remote Station $RS_1$. The VCE 24 forwards the audio/video signal to the modulator 28a via the switch 30 on the first return channel 1 frequency. The video signal modulator 28a modulates and conditions the signal and transmits the modulated audio/video signal to the Hub Station H via the remote antenna 22, the satellite 10 and the hub antenna 52. This is shown in FIG. 1 as the Remote Stations $RS_1$, $RS_2$ . . . $RS_N$ sending uplink signals $R_1$, $R_2$ . . . $R_N$, respectively.

The Hub Station H receives the modulated audio/video signal $R_1$ from the Remote Station $RS_1$ over the designated dedicated return channel 64 (the first return channel in our example). The return channel 64 passes the received audio/video signal $R_1$ to the router 51. If there are more than two participating Remote Stations, the router 51 passes those signals to the MCU 56 to combine the received signal $R_1$ from the first Remote Station $RS_1$ with all of the received video/audio signals $R_2$ . . . $R_N$ received from the other Remote Stations $RS_2$ . . . $RS_N$ over the other return channels 2-M. This forms a combined multicast videoconference signal $A=R_1+R_2...+R_N$ of the videoconference signals received from all of the active Remote Stations $RS_1$, $RS_2$ . . . $RS_N$. The MCU 56 also associates the unique address of all of the participating remote stations (including the requesting station) with the composite videoconference signal, which it had stored in memory when the requesting station initially requested to form the call.

This provides a continuous presence of the combined videoconference signal at the Remote Stations $RS_1$, $RS_2$ . . . $RS_N$, which allows the video composing of multiple unicast video frames into one individual multicast showing one stream of video (10 adp or 720 p) to feed a single screen. The MCU 56 configures the continuous presence display for the videoconference calls. The feature can be used for example when more than 2 users are simultaneously interacting between each other within multiple Remote Station locations. When only two Remote Stations are communicating, each station displays the video signal from the other station and can also optionally display the self-view. The MCU 56 recognizes when more than two Remote Stations are in a call, and determines how to arrange the video signals from each Remote Station in the composite multicast signal A for presentation on the VCE display 11. For example, if the first Remote Station $R_1$ requests to communicate with the second, third and fourth Remote Stations $R_2$, $R_3$, $R_4$, the MCU 56 may configure the screen to be divided into four sections with $R_1$ displayed in the top left, $R_2$ displayed in the top right, $R_3$ in the bottom left, and $R_4$ in the bottom right.

Once the MCU 56 forms the composite signal A, it routes that signal to one or more of the outbound multicast channels 62. The VMS 54 determines which one or more of the outbound channels 62 will transmit the multicast signal A. More than one outbound channel 62 may be needed, for instance, based on the geographical location of Remote Stations participating in the videoconference call. As shown in FIG. 1, the multicast channels 62 then multicasts the combined signal A to all of the Remote Stations $RS_1$, $RS_2$ . . . $RS_N$ via the hub antenna 52, the satellite 10 and the remote antenna 22. The composite multicast signal A is received at the Remote Stations $RS_1$, $RS_2$ . . . $RS_N$ and processed by the demodulator 28b. The demodulator 28b demodulates and conditions the received composite multicast signal. The demodulated signal is then passed from the switch 30 to the VCE 24 where it is displayed on the display monitor 11.

Accordingly, all of the Remote Stations $RS_1$, $RS_2$ . . . $RS_N$ receive the combined multicast signal which includes the modulated audio/video signal generated by each of the Remote Stations $RS_1$, $RS_2$ . . . $RS_N$, and all of the unique addresses for the remote stations that are authorized to participate in the call. For instance, the first Remote Station $RS_1$ receives the audio/video signal generated by the first Remote Station $RS_1$, as well as the audio/video signal generated by the second Remote Station $RS_2$ and the audio/video signal generated by the $N^{th}$ Remote Station $RS_N$. In essence, the system 5 is taking the unicast videoconference signal generated by the Remote Stations $RS_1$ and multicasting that signal to all of the Remote Stations $RS_1$, $RS_2$ . . . $RS_N$ for display. Thus, the system converts a unicast feed system to a multicast system to provide a continuous presence at each of the Remote Stations $RS_1$, $RS_2$ . . . $RS_N$.

Each composite videoconference signal is associated with a unique address for each one or more of the Remote Stations $RS_1$, $RS_2$ . . . $RS_N$ that were designated by the remote device 14 to participate in the videoconference call. When the Remote Stations $RS_1$, $RS_2$ . . . $RS_N$ receive the composite signal on the multicast outbound channel 62, it will process those signals which are associated with its unique address and discard all other signals. The control device 14 can also indicate that a particular videoconference is open to all receivers that wish to view it, or to a particular group of users. In that case, those videoconference signals can be presented to the receiving Remote Stations $RS_1$, $RS_2$ . . . $RS_N$, and the remote device 14 for those receiving stations can select whether or not to display a particular videoconference feed.

The individual signals are separated out by the router 30 and displayed in separate windows on the display 11 or on separate display devices. For instance, the video/audio signal from the first Remote Station $RS_1$ is shown in a first display area, the video/audio signal $RS_2$ from second Remote Station $RS_2$ is shown in a second display area, and so forth. Or, certain videoconference feeds need not be displayed. For instance, the signal from the first Remote Station $RS_1$ need not be displayed at the VCE 24 of the first Remote Station $RS_1$. This eliminates the self-view at each site, which eliminates any perceived delay between the self-view (and audio) and the composite images of the other participants during a continuous presence call. This elimination can be done, for instance, at the local VCE 24 or by repackaging the multicast stream at each switch router 30 so that the VCE 24 at Remote Station $RS_1$ only gets the videoconference signals captured at Remote Stations $RS_2 \ldots RS_N$; Remote Station $RS_2$ only gets the videoconference signals captured at Remote Stations $RS_1, RS_3 \ldots RS_N$, and so forth. The control device 14 can be utilized to designate how the various videoconference signals are displayed at the VCE 24.

At the end of the videoconference, the user operates the control device 14 to terminate the call. That command signal is transmitted through the switch 30 to the MSC channel module 26, the remote antenna 22, the satellite, and the hub antenna 52, to the VMS server 54. The frequency manager module 53 of the VMS server 54 de-allocates the SCPC return channel 64, step 110. Those return channels 64 then become available for use by other videoconferences initiated by other Remote Stations $RS_1, RS_2 \ldots RS_N$.

It should be noted that not all of the Remote Stations $RS_1$, $RS_2 \ldots RS_N$ have to capture and/or transmit a videoconference signal. Instead, one or more of the Remote Stations $RS_1$, $RS_2 \ldots RS_N$ can receive multicast signals for display only where, for instance, a video signal is intended to be viewed at stations which are only interested in receiving a signal and not transmitting a video/audio signal. Thus, if a political figure is addressing many recipients, not all of those recipient Remote Stations $RS_1, RS_2 \ldots RS_N$ need to be able to transmit a video/audio signal.

The entire communication from a transmitting Remote Station $RS_1$ to all of the Remote Stations $RS_1, RS_2 \ldots RS_N$ occurs in real time, within a fraction of a second. The capacity depends on the quality of the video, such as 384 Kbs to 1.5 Mbs for high definition and up to 25 Mbs for continuous telepresence. The bandwidth required to establish connection between two of the Remote Stations $RS_1, RS_2 \ldots RS_N$ depends on the CODECs at the VCEs 24 and the size of the display monitors where the images are displayed.

The Administrator manager 57 is a web based portal with the following sections: Users; Modem; Statistics; Billing; and Scheduling. An administrator can use the Administrator manager 57 to Add, Modify, Delete the Remote Station users and edit the information of each of the Remote Stations $RS_1$, $RS_2 \ldots RS_N$. Each of the Remote Stations $RS_1, RS_2 \ldots RS_N$ can have predefined the values to automatically configure the remote modem (specifically, the modulator 28a) when the user wants to start the communication. The administrator can manage the modem pool, adding, deleting and modifying the stacks of modems defining by the control device 14 application, set the parameters of the modems and supervise the activity. The administrator can view the statistics and frequency allocations from modules 53, 55 in real time to supervise the traffic and the capacity consumptions, Time average calls, average concurrent calls, average non-concurrent calls, etc.

The Administrator module 57 has a billing platform embedded to take reports from Call Details Records (CDR) and statistics of the system usage for each user. The administrator can establish a videoconference session from the control device 14 using the scheduling system and assist the users in arranging the videoconference. The scheduling system begins commissioning the modems and places the videoconference call automatically at the time setting in the database. The scheduling can begin the videoconferences ad-hoc or at a scheduled time.

The remote device 14 provides an external administrator interface for input of the service parameters, monitoring of the current service status and logging/reporting of the service history for later billing to the customers. Additionally an interface is based on a WEB site. Via the WEB access the Administrator/operator of the service can enter/change all required service parameters.

The administrator can also determine if a particular remote station is registered or unregistered with the system, and whether it is communicating with the remote Satellite modem and can view satellite communication statistics in real time for each remote satellite modem. When the communication ends, the status can be changed proactively and notification (from the MCU 56 or the remote control device 14) to the administrator module 57. The administrator can also view statistics on call duration, frequency assigned, jitter, delay, packet loss, etc., and check the usage of the satellite modem availability to determine the utilization and activate or deactivate the channels 62, 64.

The invention saves bandwidth on the uplink channel, as well as on the downlink channel. On the uplink side of the communication, each station only needs to send a signal to the satellite; not to the other stations. For instance, in a network of four Remote Stations $RS_1, RS_2, RS_3, RS_4$, only four return channels 64 are needed for each station to transmit its uplink signal to the satellite 10. The satellite 10 then transmits each of those uplink signals to each station on one or more of the downlink multicast channel 62. Thus, whereas a unicast system would require six transmit channels and six receive channels; the present invention only requires four uplink channels and one downlink channel. In addition, that single downlink channel can be received by any or all of the Remote Stations. In our example, that one downlink channel can be received by one or more of the four $RS_1, RS_2, RS_3, RS_4$, as well as any additional number of receiving Remote Stations $RS_5 \ldots RS_N$. And, it can also be received by an additional hundred or thousand stations or more which are only capable of receiving and displaying the audio/video signal. Accordingly, the Remote Stations $RS_5 \ldots RS_N$ preferably do not communicate with each other directly, but only via the satellite 10.

The invention also saves bandwidth on the downlink channel since only a single frequency is needed for the downlink channel. The uplink frequencies are aggregated and sent on the single downlink frequency. Any number of stations can receive the downlink signal without having to increase the bandwidth to transmit to those stations.

The system 5 preferably includes a plurality of Remote Station $RS_1, RS_2 \ldots RS_N$ networked to each other. The Remote Stations and the Hub station can each have a memory, processing capacity, a display device and/or an input device. The Remote Stations and Hub Station can be implemented by a processor or a server. In particular, the VMS Server 54, MCU 56, MSC control 26, modulator 28a, demodulator 28b, and control interface 14 can be implemented by one or more processors or servers running software and having an input device and/or memory such as RAM or a hard drive, which carry out the functions of the Hub Station H and the Remote Stations $RS_1, RS_2 \ldots RS_N$. The operations of the system 5 are all performed automatically in real-time, without manual interaction. It will be apparent however, that more than one Hub station can be provided.

The Remote and Hub Stations each perform various functions and operations in accordance with the invention. The Remote and Hub Stations can be, for instance, a personal computer (PC), server or mainframe computer. All or parts of the system and processes can be stored on or read from computer-readable media, such as a hard drive, disks, CD-ROM, DVD, read-only memory (ROM) or random-access memory (RAM). The system can include computer-readable medium having stored thereon machine executable instructions for performing the processes described.

The Hub Station H and Remote Stations $RS_1$, $RS_2$ ... $RS_N$ are shown for illustrative purposes only without intending to limit the preferred embodiment. One skilled in the art will recognize that any suitable station can be utilized, and they need not be "hub" and "remote" stations. In addition, the term "video," "videoconference," and "audio/video signal" is meant here to include both video and/or audio data. The invention has been shown and described for use with videoconferencing. However, other forms of data can also be transmitted, such as a PowerPoint document, either with or instead of the video/audio signals which can be simultaneously displayed. And, while the bandwidth allocation on demand is used to set up video calls, the system can also be utilized for video surveillance, data on demand, or other data.

It is also noted that the MCU 56 and the VMS server 54 are shown as separate elements. It should be apparent that those can be combined into a single device which implements the functions of both of those devices.

The foregoing description and drawings should be considered as illustrative only of the principles of the invention. The invention may be configured in a variety of manners and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A videoconference system comprising:
   a plurality of videoconference terminals each configured to generate a videoconference signal and transmit the videoconference signal on a designated channel amongst a plurality of channels;
   a router configured to receive the videoconference signals from each of the plurality of channels;
   a control module configured to form a composite videoconference signal having the received videoconference signals, and transmit the composite videoconference signal over a multicast channel different from the plurality of channels, wherein the plurality of videoconference terminals receive the composite videoconference signal and present the videoconference signal; and
   a frequency allocation manager configured to receive a communication request from one of the plurality of videoconference terminals, determine availability of the plurality of channels, and assign one of the plurality of channels to the one of the plurality of videoconference terminals on demand based on the determined availability.

2. The system of claim 1, wherein the plurality of channels each comprise a unique frequency allocated on demand and retransmitted via satellite multicast to all videoconferencing participants.

3. The system of claim 1, wherein the composite videoconference signal comprises a continuous presence videoconference signal over a multicast channel available to all videoconferencing participants.

4. The system of claim 1, wherein each of said plurality of videoconference terminals are further configured to eliminate the videoconference signal from the composite signal which was generated by that respective one of said plurality of videoconference terminals, and to present the videoconference signals from the composite signal which were not generated by that respective one of said plurality of videoconference terminals.

5. The system of claim 1, wherein the control module comprises a media control unit.

6. A videoconference system comprising:
   a plurality of videoconference terminals each configured to generate a videoconference signal, transmit the videoconference signal on a designated channel amongst a plurality of channels, and transmit a command signal over a dedicated control channel different than the plurality of channels;
   a router configured to receive the videoconference signals from each of the plurality of channels; and
   a control module configured to form a composite videoconference signal having the received videoconference signals, and transmit the composite videoconference signal over a multicast channel different from the plurality of channels, wherein the plurality of videoconference terminals receive the composite videoconference signal and present the videoconference signal.

7. The system of claim 6, wherein the command signal comprises a videoconference initiation request.

8. The system of claim 7, further comprising a user interface configured to generate the videoconference initiation request in response to a user input.

9. The system of claim 7, wherein said router and said control module are at a central location and communicate via satellite with said plurality of videoconference terminals to control frequency assignments on demand.

10. The system of claim 9, wherein said system has a star configuration.

11. The system of claim 9, wherein said first videoconference terminal is further configured to receive the videoconference signal on the second channel and present the videoconference signal.

12. The system of claim 9, wherein said second videoconference terminal comprises a display and said second videoconference terminal is configured to display the videoconference signal on said display.

13. A videoconference system comprising:
    a first videoconference terminal configured to generate a videoconference signal and transmit the videoconference signal on a first channel;
    a router configured to receive the videoconference signal from the first channel;
    a control module configured to send the received videoconference signal over via satellite on a second channel different from the first channel; and
    a second videoconference terminal configured to receive the videoconference signal on the second channel and present the videoconference signal.

14. The videoconference system of claim 13, wherein said first videoconference terminal transmits the videoconference signal on the first channel of the satellite.

15. A videoconference system comprising a plurality of videoconference terminals each configured to generate a videoconference signal and transmit the videoconference signal on a designated channel amongst a plurality of channels via satellite to a centralized server which forms a composite videoconference signal having the received videoconference signals from each of the plurality of videoconference terminals, each of said plurality of videoconference terminals further configured to receive via satellite a composite videoconference signal on a multicast channel different from the plurality of channels from the centralized server, and present the videoconference signal.

16. A videoconference system comprising a centralized server associated with a plurality of communication channels and a dedicated control channel, said centralized server configured to receive a videoconference request signal from one of a plurality of videoconference terminals over the dedicated control channel, determine the availability of the plurality of communication channels, and assign one of the plurality of communication channels to the requesting videoconference terminal.

17. The videoconference system of claim 16, said centralized server further configured to receive videoconference signals over each of the plurality of communication channels from the videoconference terminals, and create a composite signal including each of the videoconference signals.

18. The videoconference system of claim 17, the videoconference request signal identifying authorized videoconference terminals and said centralized server is further configured to associate with the composite signal an address for each of the requesting videoconference terminal and the authorized videoconference terminals.

19. The videoconference system of claim 17, said centralized server further configured to transmit the composite signal over a multicast channel different than the plurality of communication channels.

20. The videoconference system of claim 16, wherein the communication channels are satellite communication channels and the centralized server communicates with the plurality of videoconference terminals via satellite only.

* * * * *